US007611095B1

(12) United States Patent  
Alban, III et al.

(10) Patent No.: US 7,611,095 B1  
(45) Date of Patent: Nov. 3, 2009

(54) AERODYNAMIC RE-ENTRY VEHICLE CONTROL WITH ACTIVE AND PASSIVE YAW FLAPS

(75) Inventors: William H. Alban, III, Chesterfield, MO (US); Karl A. Johnston, Fenton, MO (US); Edward A. Eiswirth, Chesterfield, MO (US); David E. Morgan, Ballwin, MO (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/857,205

(22) Filed: Sep. 18, 2007

Related U.S. Application Data

(63) Continuation of application No. 11/414,607, filed on Apr. 28, 2006, now abandoned.

(51) Int. Cl.  
*B64G 1/24* (2006.01)

(52) U.S. Cl. .................................. 244/158.7; 244/3.22

(58) Field of Classification Search ............... 244/158.7, 244/158.9, 159.1, 3.24, 3.27, 171.7, 171.8, 244/3.22; 102/374, 386, 388, 501  
See application file for complete search history.

(56) References Cited

U.S. PATENT DOCUMENTS

| | | | | |
|---|---|---|---|---|
| 3,125,313 A | * | 3/1964 | Soderberg | 244/87 |
| 3,188,958 A | * | 6/1965 | Burke et al. | 244/3.14 |
| 3,203,650 A | * | 8/1965 | Christenson | 244/46 |
| 3,262,365 A | * | 7/1966 | Warren et al. | 89/1.51 |
| 3,276,722 A | * | 10/1966 | Eggers, Jr. et al. | 244/159.3 |
| 3,287,019 A | * | 11/1966 | Arthur | 273/362 |
| 3,343,767 A | * | 9/1967 | Cafissi | 244/3.27 |
| 3,761,041 A | * | 9/1973 | Putman | 244/13 |
| 4,699,333 A | * | 10/1987 | Pinson | 244/3.21 |
| 4,903,918 A | * | 2/1990 | Park et al. | 244/158.7 |
| 5,143,320 A | * | 9/1992 | Boyadjian | 244/3.21 |
| 5,282,588 A | * | 2/1994 | August | 244/3.3 |
| 5,398,887 A | * | 3/1995 | Wassom et al. | 244/3.22 |
| 6,349,903 B2 | | 2/2002 | Caton et al. | |
| 6,502,785 B1 | * | 1/2003 | Teter et al. | 244/3.22 |
| 6,616,093 B1 | * | 9/2003 | Albrektsson et al. | 244/3.23 |
| 6,666,402 B2 | * | 12/2003 | Rupert et al. | 244/3.27 |
| 6,796,526 B2 | | 9/2004 | Boehringer | |
| 6,892,982 B2 | * | 5/2005 | Clark | 244/36 |
| 7,229,048 B1 | * | 6/2007 | August | 244/158.7 |

* cited by examiner

*Primary Examiner*—Michael Carone  
*Assistant Examiner*—Brian M O'Hara  
(74) *Attorney, Agent, or Firm*—Harness, Dickey & Pierce, P.L.C.

(57) ABSTRACT

A yaw control system is provided for use in a hypersonic airborne mobile platform, for example a re-entry vehicle. The system includes an active movable yaw control flap positioned between passive/fixed yaw ear surfaces that border or frame the active yaw flaps. The yaw control system includes an active yaw control flap embedded between passive/fixed yaw ear surfaces. The retracted active yaw control flap and passive/fixed yaw ear surfaces provide passive yaw damping during atmosphere reentry, bank-to-turn steering and midcourse fly-out/glide steering. The active yaw control flaps are preferably arranged on opposing sides of a re-entry vehicle, and may be independently extended to provide for steering the vehicle. The active yaw control flaps provide for active yaw control skid-to-turn terminal guidance to achieve a desired level of accuracy, such as needed when using the vehicle as a missile to strike a target.

24 Claims, 2 Drawing Sheets

AERODYNAMIC RE-ENTRY VEHICLE CONTROL WITH ACTIVE AND PASSIVE YAW FLAPS

CROSS-REFERENCE TO RELATED APPLICATION

This application claims the benefit of and is a continuation of U.S. patent application Ser. No. 11/414,607 filed on Apr. 28, 2007.

The present disclosure relates to aerodynamic vehicles, and more specifically to control surfaces for aerodynamic vehicles intended to enter a planetary atmosphere and to be guided to a location.

BACKGROUND

The statements in this section merely provide background information related to the present disclosure and may not constitute prior art.

The flight of a vehicle into a planetary atmosphere requires aerodynamic control during re-entry and flight at hypersonic speeds. During the vehicle's entry into the atmosphere and subsequent flight, the vehicle must utilize its control surfaces to enable the vehicle to reach its intended destination. These control surfaces are subjected to aerodynamic heating and aero-heating induced surface erosion of the controls.

SUMMARY

The present disclosure relates to various embodiments and methods for implementing yaw control on an aerodynamic hypersonic vehicle. One embodiment involves the implementation of yaw control surfaces on an aerodynamic vehicle designed for re-entry into the Earth's atmosphere or other planetary atmospheres. At least one active movable yaw control surface is positioned between fixed bordering yaw surfaces on each side of the vehicle. In the various embodiments, the fixed yaw control surfaces and embedded movable active yaw control surface are incorporated into a re-entry vehicle, to provide improved accuracy in guiding the vehicle to an intended destination.

In one embodiment, a yaw control surface for a re-entry vehicle is provided that is capable of guiding the vehicle to hit a target with a desired level of accuracy. The control surface comprises an active yaw control flap embedded between passive/fixed yaw ear surfaces. The active yaw control flap and passive/fixed yaw ear surfaces allow for passive yaw damping during atmosphere reentry, bank-to-turn steering and midcourse fly-out/glide steering. The active yaw control flaps are preferably arranged on opposing sides of the re-entry vehicle, and may be individually extended to provide vehicle steering. The active yaw control flaps provide for active yaw control skid-to-turn terminal guidance.

In another aspect, various embodiments of an aerodynamic vehicle are provided that comprise at least two movable active yaw control flap surfaces arranged on generally opposite sides of the vehicle. In one embodiment of an aerodynamic vehicle, the vehicle comprises a body having an outer surface defining a generally tapered conical shape, and two movable active yaw control surfaces on generally opposite sides of the body. Each yaw flap surface is moveable between an extended position that provides a turning moment to the aerodynamic vehicle, and a retracted position. The aerodynamic vehicle further includes at least two passive/fixed yaw surfaces that border opposite sides of each of the movable yaw control flap surfaces. The two passive/fixed yaw control surfaces, together with the movable yaw control surface in its retracted position, provide for passive yaw stabilization of the vehicle. The two passive/fixed yaw surfaces surround the movable yaw control surface, so as to shield the movable yaw control surface from erosion resulting from re-entry into a planetary atmosphere. This allows the movable active control flap surface to be preserved, and thus maintain vehicle maneuverability capable of achieving a desired guidance accuracy at the end of flight when active skid-to-turn guidance control is desired.

In another aspect of the disclosure, a method is provided for controlling the steering of an aerodynamic vehicle. In one implementation, the method comprises providing fixed yaw ears resulting in passive yaw dampening during atmosphere reentry, bank-to-turn and midcourse fly-out/glide steering and active yaw control skid-to-turn terminal guidance. The method of passive yaw control during re-entry preserves active yaw control for use during terminal guidance. The active yaw control enables steering to achieve less than 5 meters Circular Error Probable (CEP). The combined system results in minimum energy consumption since the active yaw controls do not have to be powered throughout flight.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figures 1A, 1B:
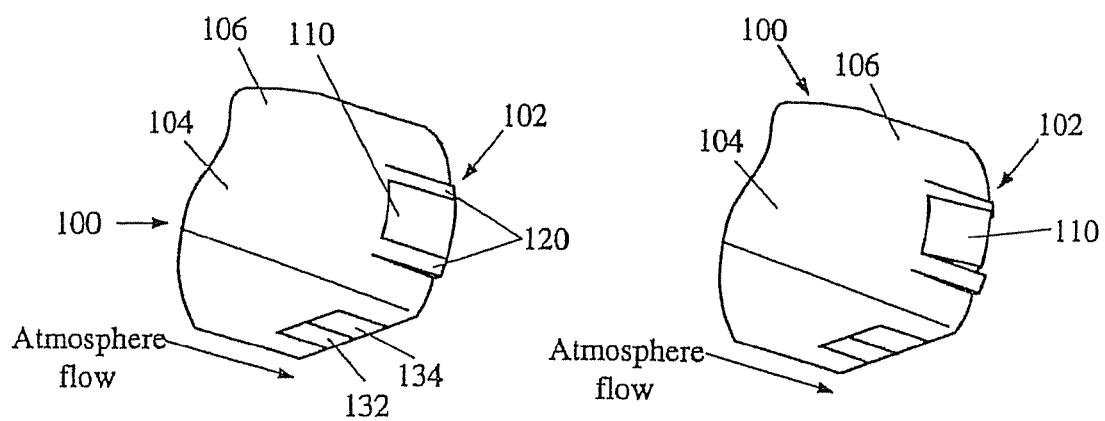
FIG. 1 shows one embodiment of a yaw control surface design in retracted (FIG. 1A) and extended (FIG. 1B) positions on an aerodynamic vehicle.

The following description is merely exemplary in nature and is not intended to limit the present disclosure, application, or uses. It should be understood that throughout the drawings, corresponding reference numerals indicate like or corresponding parts and features.

FIGS. 1A and 1B illustrate one embodiment of a control surface 102 for control of a re-entry vehicle 100 capable of hitting a target with a desired level of accuracy. The control surface 102 comprises an active movable yaw control flap 110 embedded between passive/fixed yaw ear surfaces 120. The active yaw control flap 110 and passive/fixed yaw ear surfaces 120 allow for passive yaw damping during atmosphere re-entry, bank-to-turn steering and midcourse fly-out/glide steering. Midcourse fly-out/glide steering typically occurs during navigation of the vehicle towards a target but prior to locking in on a target. The active yaw control flaps 110 are preferably arranged on opposing sides of the re-entry vehicle 100, and may be independently extended and controlled as shown in FIG. 1B to provide for steering the vehicle 100. The active yaw control flaps 110 provide skid-to-turn terminal guidance. The passive/fixed yaw-ear control surfaces 120, together with the active yaw control flap 110 in a retracted position as shown in FIG. 1A, provide for passive yaw dampening. When combined with independently controllable split windward flaps 132, 134 (such as pitch/roll control surfaces), the active yaw control surfaces 110 allow for three degrees of freedom in rotational control of a re-entry vehicle. In addition, the active yaw control flaps 110 can both be extended to provide additional drag, providing a fourth degree of freedom of control of the reentry vehicle 100. When retracted, the active movable yaw control flap 110 is generally coplanar with the passive/fixed yaw-ear control surfaces 120. Similarly, when retracted, the control surfaces 132, 134 are also both generally co-planar or flush with the outer surface 104 of the body portion 106 of the vehicle 100.

Figure 2:
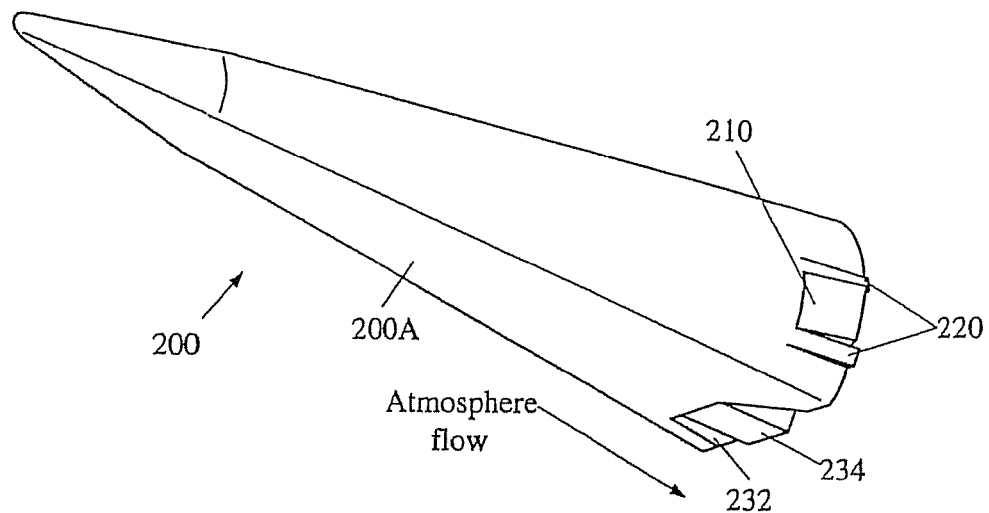
FIG. 2 shows one embodiment of an aerodynamic vehicle having yaw control surfaces in accordance with the principles of the present disclosure.

Referring to FIG. 2, a second embodiment of an atmosphere entry vehicle 200 is provided that comprises two or more active moveable yaw control surfaces 210 that form controllable, movable flaps. The atmospheric entry vehicle 200 is typically capable of operating at speeds ranging from about 23,500 feet per second (7163 meters/second) to about 800 feet per second (244 meters/second), and at altitudes from about 300,000 feet (91,440 meters) to about 300 feet (91 meters) below sea level. The atmospheric entry vehicle 200 is expected to reach re-entry speeds above 18,000 feet per second (5486 meters/second), which are known to erode control surfaces due to aero-heating. The active moveable yaw control surfaces 210 in the vehicle 200 can be used from at least about 800 feet per second to at about 23,500 feet per second (244 to 7163 meters/second), but are primarily designed to be used for active yaw control in speeds from about 2,000 to 5,000 feet per second (610 to 1524 meters/second).

The vehicle 200 includes two or more active moveable yaw control surfaces 210 that are each positioned between bordering passive/fixed yaw control surfaces 220. The active movable yaw control surfaces 210, each bordered by the passive/fixed yaw control surfaces 220, are preferably arranged on generally opposite sides of the vehicle 200. Each active yaw control surface 210 is movable between at least one extended or deployed position and a retracted position between the bordering passive/fixed yaw control surfaces 220. The passive/fixed yaw "ear" control surfaces 220 together with the retracted movable yaw control surface 210, provide for passive yaw stabilization in maneuvering during entry into the Earth's atmosphere and during midcourse flight. The active and passive/fixed yaw control surfaces 210, 220 respectively give the vehicle 200 both bank-to-turn maneuvering and skid-to-turn maneuvering capability.

Figure 3A:
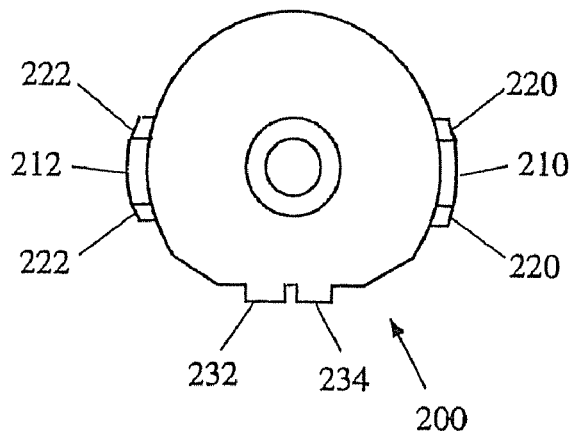
FIG. 3 shows front views of the vehicle of FIG. 2, with the active yaw flaps in various positions.
Figure 3B:
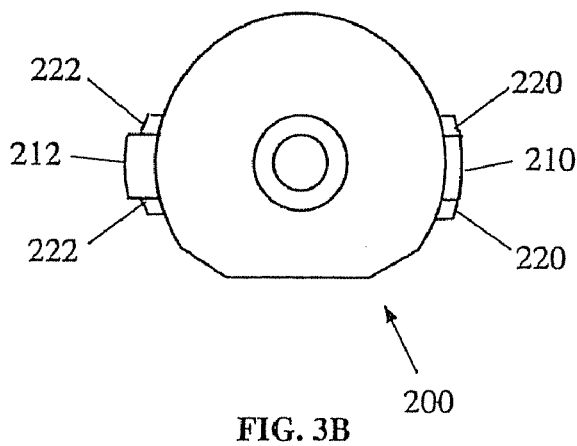
Figure 3C:
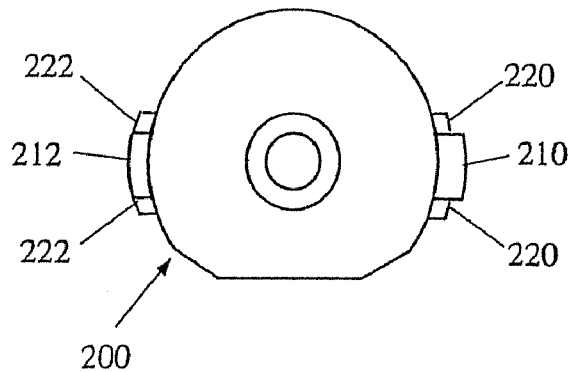

Referring to FIGS. 3A, 3B, and 3C, the vehicle 200 is configured to allow bank-to-turn steering during re-entry into the atmosphere (FIG. 3A), and skid-to-turn steering (FIGS. 3B and 3C) in terminal flight towards the intended destination. The passive/fixed yaw control surfaces 220 and 222 (together with the active yaw control surfaces 210 when retracted) provide passive yaw dampening in bank-to-turn maneuvers during re-entry and midcourse flight. The passive/fixed yaw-ear control surfaces 220, 222 and additional, optional, independently controllable windward pitch/roll control surfaces 232, 234, allow the vehicle 200 to roll and pitch in a select direction for bank-to-turn steering maneuvers. The benefit of bank-to-turn maneuvering is higher maneuverability for a lifting body such as the non-circular cross-section of vehicle 200. The active movable yaw control surfaces 210 and 212 provide for skid-to-turn maneuvers. The benefit of skid-to-turn steering is faster response, because there is no roll required.

Referring further to FIGS. 3A-3C, extension or deployment of the movable active yaw control surfaces 210 and 212 are shown in more detail. In skid-to-turn steering, the extension or deployment of the yaw control surface 212 causes a turning moment to the right, as in FIG. 3B. The deployment of the yaw control surface 210 causes a turning moment to the left, as in FIG. 3C. Simultaneous deployment of both control surfaces 210, 212 can also be used as a drag device to slow down the vehicle 200. When retracted, the active yaw control surfaces 210, 212 are generally flush with the passive/fixed yaw control surfaces 220 and 222, and operate together as part of the passive yaw stabilization surface that provides for bank-to-turn steering. The additional windward pitch/roll control surfaces 232, 234, when retracted, are generally co-planar to the vehicle surface 200A (FIG. 2).

In the various embodiments of an atmospheric entry vehicle, a computer (not shown) controls movement of the one or more control surfaces through actuators (not shown). The computer can provide for vehicle navigation or missile guidance to achieve a precision guidance capability of about three meters Circular Error Probable (CEP) utilizing the subject active yaw controls, a class-2 navigational grade inertial measurement unit, and a GPS aided navigation system using, for example, Boeing's coupled Inertial Navigation System (as used on Joint Direct Attack Munition, or "JDAM", and on the Small Diameter Bomb, or "SDB"). The vehicle's guidance system, is electrically powered from a battery (not shown).

The vehicle 200 may be controlled to bank and turn for steering in a desired direction during re-entry and midcourse flight, through the use of the vehicle's passive/fixed yaw surfaces 220 (with retracted active controls 210) and active pitch/roll control surfaces 232 and 234. The severe hypersonic environments experience during re-entry into the atmosphere and midcourse fly-out causes the deterioration of the passive/fixed yaw control surfaces 220. In particular, the fixed yaw surfaces 220, 222 take the brunt of aero-heating induced erosion that occurs during re-entry flight and midcourse flight, during which the passive/fixed yaw-ear surfaces 220, 222 are used for passive stabilization in bank-to-turn maneuvers of the vehicle 200. The passive/fixed yaw control surfaces 220, 222 not only preserve the active yaw control surfaces 210, 212 from erosion, but also preserve battery power that would otherwise be used for controlling active yaw-control surfaces in bank-to-turn maneuvers. Accordingly, the passive/fixed yaw-ear control surfaces 220, 222 can reduce battery power steering up to the terminal phase (during bank-to-turn), as well as preserve the active yaw control surfaces 210, 212 (this assumes a passive restraint device (not shown) on the actuators (not shown) which move the active yaw control surfaces). The use of the passive/fixed yaw-ear control surfaces 220, 222 preserves the active moveable yaw control surfaces 210, 212 for later use in skid-to-turn steering during the terminal end-of-flight stage towards the intended destination.

The vehicle 200 may perform skid-to-turn maneuvers to steer in a desired direction, using the active movable yaw-control surfaces 210, 212. The advantage of a skid-to-turn maneuver is a faster vehicle response, since there is no roll required to orient the vehicle to reduce an error in the yaw plane. The survivable active movable yaw control surfaces 210, 212 thus provide for improved terminal flight guidance towards the intended destination. The integral passive/fixed yaw-ear control surfaces and active yaw control surface design allows for preserving substantially all of the active control surfaces for terminal flight use, unlike existing yaw surface designs. By preserving substantially all of the available active yaw control surface, the vehicle is able to achieve faster response in skid-to-turn steering during terminal flight, to improve guidance towards the intended destination. The integral passive/fixed yaw-ear control surface and active yaw control surface design thus provides even better guidance control towards a target, at all impact speeds while achieving higher accuracy. The atmospheric reentry vehicle having the passive/fixed and active yaw-control surfaces 210, 212, 220 and 222 provides for stable and damped operation during re-entry into the Earth's atmosphere, and survives aero-heating during re-entry while minimizing energy consumption.

In the atmospheric re-entry vehicles 100, 200, the control surfaces 110, 132, 134, 210, 212, 232 and 234 may be secured for pivotal movement relative to their respective vehicle in any known conventional manner. The atmospheric entry vehicles 100, 200 comprising the improved passive/fixed and active yaw control surface design accordingly provides for improved steering and guidance for achieving an accuracy of less than about five meters Circular Error Probable (CEP), in either vertical impact or horizontal impact into a vertical structure, given a class-2 navigational grade inertial measurement unit and a GPS aided navigation system. Without the use of the disclosed integral passive/fixed and active yaw control surface design, the miss distance of such vehicles attempting to hit a target using windward pitch/roll control surfaces 232 and 234 alone or another aerodynamic control method is typically approximately 10 meters CEP. When, combined with windward pitch/roll control surfaces 232 and 234, the passive/fixed and active yaw control surfaces allow for three degrees of freedom in rotational control of a re-entry vehicle. In addition, the active yaw flap control surfaces 210, 212 can both be extended to provide additional drag, providing a fourth degree of freedom of control of the re-entry vehicle.

In another aspect, a method for controlling the operation of an aerodynamic vehicle having at least one movable active control surface nested between adjacent fixed control surfaces is provided. The method comprises maintaining the at least one movable active control surface in a stowed position, in which the movable active control surface is generally flush with the adjacent fixed control surfaces, until the aerodynamic vehicle has completed entry into the earth's atmosphere. The method further comprises controllably deploying the at least one movable control surface as required to provide skid-to-turn maneuvering for guiding the aerodynamic vehicle after it has completed entry into the earth's atmosphere. By maintaining the active control surface in a retracted or stowed position until after reentry, to thereby preserve substantially all of the moveable control surface, the vehicle is able to achieve greater maneuverability for improving guidance control towards the target. While the above disclosure of exemplary embodiments describes the movable active control surface as a yaw control surface, it should be understood that pitch, roll or other control surfaces may also employ the novel control surface design disclosed herein. Such variations are not to be regarded as a departure from the spirit and scope of the invention. Accordingly, it is not intended that the invention be limited by the particular form illustrated and described above, but by the appended claims.

What is claimed is:

1. A control system for controlling flight of a hypersonic vehicle, comprising:
   a movable yaw control surface disposed on a body portion of the vehicle;
   a pair of fixed yaw control surfaces disposed on said body portion of said vehicle adjacent to, and on opposite sides of, said movable yaw control surface, and projecting outwardly from said body portion, the pair of fixed yaw control surfaces disposed closely adjacent and generally parallel to side portions of the movable yaw control surface to shield portions of the movable yaw control surface from erosion resulting from entry into a planetary atmosphere, such that substantially all of the movable yaw control surfaces are preserved to provide maximum maneuverability for the vehicle; and
   said movable yaw control surface being controllably movable between at least one deployed position projecting outwardly from said body portion, and a retracted position, for controlling at least one of a flight path and attitude of said vehicle during flight.

2. The control system of claim 1, wherein said control system uses said fixed yaw control surface to effect passive yaw stabilization during bank-to-turn steering of said vehicle during re-entry and midcourse fly-out glide steering of the vehicle in a planetary atmosphere during flight.

3. The control system of claim 1, wherein said control system uses said movable yaw control surface to effect skid-to-turn terminal guidance to steer the vehicle.

4. The control system of claim 1, further comprising right and left movable yaw control surfaces disposed on opposite sides of the vehicle, and first and second pairs of fixed yaw control surfaces disposed on opposite sides of the vehicle adjacent respective ones of the movable yaw control surfaces.

5. The control system of claim 1, wherein the fixed yaw control surface bordering the movable yaw control surface receives a portion of aero-heating induced erosion that results from re-entry into a planetary atmosphere, to preserve the movable yaw control surface for maintaining maneuverability of the vehicle.

6. The control system of claim 1, wherein the fixed yaw control surface reduces the need for activating the movable yaw control surface during re-entry flight into the atmosphere.

7. A yaw control system for a hypersonic, re-entry vehicle, comprising:
   at least two movable yaw control surfaces arranged on generally opposite sides of the vehicle, each said movable yaw control surface being capable of moving independently of the other between at least one extended position that operates to apply a turning moment to the vehicle, and a retracted position; and
   two pairs of fixed yaw control surfaces that each border opposite sides of a respective one of the movable yaw control surfaces and that project outwardly from an outer surface of a body of the vehicle;
   each said pair of fixed yaw control surfaces together with its respective said movable yaw control surface, when said movable yaw control surface is in its retracted position, providing passive yaw stabilization for maneuvering when entering a planetary atmosphere; and
   wherein the fixed yaw control surfaces operate to shield the movable yaw control surfaces from erosion resulting from entry into the planetary atmosphere, such that substantially all of each of the movable yaw control surfaces are preserved.

8. The yaw control system of claim 7, wherein each said pair of the fixed yaw control surfaces, together with its respective said movable yaw control surface, when in its retracted position, provides passive yaw stabilization for the vehicle.

9. The yaw control system of claim 7, wherein the at least two movable yaw control surfaces may both be extended for use in increasing drag to reduce the speed of the aerodynamic vehicle.

10. The yaw control system of claim 7, wherein the fixed yaw control surfaces bordering one of said movable yaw control surface receive the brunt of the aero-heating induced erosion that results from re-entry flight of the vehicle into the planetary atmosphere, to preserve substantially all of the movable yaw control surface for maintaining maneuverability of the vehicle during terminal approach towards an intended destination.

11. The yaw control system of claim 10, wherein the fixed yaw control surfaces reduce the need for extending the movable yaw control surfaces during re-entry into the planetary atmosphere.

12. The yaw control system of claim 10, wherein the fixed yaw control surfaces provide passive yaw dampening for bank-to-turn maneuvers during re-entry flight of the vehicle into the planetary atmosphere and during midcourse flight.

13. The yaw control system of claim 11, wherein the movable yaw control surfaces are independently extended to perform skid-to-turn steering maneuvers with a faster response time for guiding the vehicle on terminal flight towards the destination.

14. A hypersonic vehicle comprising:
a body having an outer surface defining a generally tapered conical shape;
at least two movable yaw control surfaces arranged at spaced apart locations on said body, with each said movable yaw control surface being moveable between an extended position that operates to apply a turning moment to the body during flight of the vehicle, and a retracted position; and
a pair of fixed yaw control surfaces associated with each one of said movable yaw control surfaces, each said pair of fixed yaw control surfaces being positioned adjacent to the sides of an associated one of said movable yaw control surfaces and projecting from said outer surface of said body;
when each of said movable yaw control surfaces is in said retracted position, its respective pair of fixed yaw control surfaces provide passive yaw stabilization for the vehicle during flight of the vehicle; and
each said pair of fixed yaw control surfaces adapted to shield side portions of its associated said movable yaw control surface from erosion resulting from heat generation during entry into a planetary atmosphere.

15. The hypersonic vehicle of claim 14, wherein the two movable yaw control surfaces may both be extended to increase drag to reduce the speed of the vehicle.

16. The hypersonic vehicle of claim 14, wherein each said pair of fixed yaw control surfaces border at least two sides of its said respective movable yaw control surface to shield the movable yaw control surface from erosion resulting from entry into a planetary atmosphere, such that substantially all of the movable yaw control surfaces are preserved to provide maximum maneuverability for the vehicle.

17. The hypersonic vehicle of claim 16, wherein the fixed yaw control surfaces and the movable yaw control surfaces enable the vehicle to achieve a guidance accuracy of less than about 5 meters Circular Error Probable (CEP).

18. The hypersonic vehicle of claim 14, wherein the fixed yaw control surfaces together with the movable yaw control surface, in its retracted position, provide passive yaw stabilization for the vehicle.

19. The hypersonic vehicle of claim 16, wherein the fixed yaw control surfaces bordering the movable yaw control surface receive a majority of aero-heating induced erosion that results from re-entry of the vehicle into the planetary atmosphere, to preserve substantially all of the movable yaw control surfaces for maintaining maneuverability of the vehicle during terminal approach towards an intended destination.

20. The hypersonic vehicle of claim 17 wherein a battery is used to power at least the steering of the vehicle, and the fixed yaw control surfaces reduce the frequency of extending the movable yaw control surfaces during re-entry into the planetary atmosphere, thereby reducing the amount of battery power utilized for steering.

21. The hypersonic vehicle of claim 17 wherein the fixed yaw control surfaces provide yaw dampening for bank-to-turn maneuvers during re-entry of the vehicle into the planetary atmosphere and during a midcourse phase of vehicle flight.

22. The hypersonic vehicle of claim 18, wherein the movable yaw control surfaces are individually extendable to perform skid-to-turn steering maneuvers with a faster response time for guiding the vehicle on terminal flight towards the destination.

23. The hypersonic vehicle of claim 18, wherein the movable yaw control surfaces are maintained in a retracted position flush with the fixed yaw control surfaces during re-entry into an atmosphere and bank-to-turn maneuvers during midcourse flight, to preserve the movable yaw control surfaces for use during terminal guidance towards the destination.

24. A method for controlling the operation of a hypersonic vehicle having at least one movable control surface, the method comprising:
using at least a pair of fixed control surfaces disposed closely adjacent to side portions of the at least one movable control surface to cover the side portions of the at least one movable control surface when the at least one movable control surface is in a retracted position, the fixed control surfaces projecting from an outer surface of the vehicle and assisting in providing yaw control of the vehicle;
maintaining the at least one movable control surface in a stowed position, in which the at least one movable control surface is generally flush with the adjacent fixed control surface, until the vehicle has completed entry into the earth's atmosphere; and
subsequently controlling the extension and retraction of the at least one movable control surface as needed to provide skid-to-turn maneuvering for guiding the vehicle towards a target.

* * * * *